United States Patent [19]

Sidwell et al.

[11] Patent Number: 5,057,059

[45] Date of Patent: * Oct. 15, 1991

[54] BELT TENSIONER AND METHOD OF MAKING THE SAME

[75] Inventors: John N. Sidwell; Linn E. Corbin, both of Springfield, Mo.

[73] Assignee: Dayco Products, Inc., Dayton, Ohio

[*] Notice: The portion of the term of this patent subsequent to Nov. 20, 2007 has been disclaimed.

[21] Appl. No.: 576,299

[22] Filed: Aug. 31, 1990

Related U.S. Application Data

[62] Division of Ser. No. 450,656, Dec. 13, 1989, Pat. No. 4,971,589.

[51] Int. Cl.$^5$ .............................................. F16H 7/08
[52] U.S. Cl. .............................................................. 474/135
[58] Field of Search .................... 474/101, 109–111, 474/113–117, 133–135, 136, 138; 29/159 A

[56] References Cited

U.S. PATENT DOCUMENTS

| | | | |
|---|---|---|---|
| 4,473,362 | 9/1984 | Thomey et al. | 474/135 |
| 4,551,120 | 11/1985 | Thomey | 474/135 |
| 4,596,538 | 6/1986 | Henderson | 474/135 |
| 4,661,087 | 4/1987 | Henderson | 474/135 |
| 4,784,631 | 11/1988 | Henderson | 474/135 |
| 4,886,483 | 12/1989 | Henderson | 474/135 |
| 4,906,222 | 3/1990 | Henderson | 474/135 |

Primary Examiner—Thuy M. Bui
Attorney, Agent, or Firm—Joseph V. Tassone

[57] ABSTRACT

A belt tensioner and method of making the same are provided, the tensioner comprising a support for being fixed relative to a belt, a belt engaging arm carried by the support and being movable relative thereto, a spring operatively associated with the support and the belt engaging arm for urging the belt engaging arm relative to the support and against the belt with a force to tension the belt, the support comprising a shaft having a longitudinal axis, the belt engaging arm being rotatably mounted on the shaft, the arm having a bearing surface angled relative to the axis and the support having a bearing surface angled relative to the axis and facing the bearing surface of the arm, and a bushing disposed between the bearing surfaces and in engagement therewith to facilitate movement therebetween and to tend to prevent cocking of the arm on the shaft when the belt engaging arm is tensioning the belt.

19 Claims, 4 Drawing Sheets

BELT TENSIONER AND METHOD OF MAKING THE SAME

CROSS REFERENCE TO RELATED APPLICATIONS

This application is a divisional patent application of its copending parent patent application, Ser. No. 450,656, filed Dec. 13, 1989, now U.S. Pat. No. 4,971,589.

BACKGROUND OF THE INVENTION

1. Field of the Invention

This invention relates to a new tensioner for a power transmission belt or the like and to a new method of making such a tensioner.

2. Prior Art Statement

It is known to provide a tensioner for a power transmission belt that is adapted to be operated in an endless path, the tensioner comprising a support means for being fixed relative to the belt, a belt engaging means carried by the support means and being movable relative thereto, and spring means operatively associated with the support means and the belt engaging means for urging the belt engaging means relative to the support means and against the belt with the force to tension the belt, the support means comprising a shaft means having a longitudinal axis, the belt engaging means comprising an arm rotatably mounted on the shaft means. For example, see the Henderson U.S. Pat. No. 4,596,538.

It is also known to applicants to utilize bushing means between the rotatable arm and an arm plate means of the support means to tend to prevent cocking of the arm on the shaft means of the tensioner when the belt engaging means is tensioning a belt. For example, see the co-pending patent application of Dewey D. Henderson, Ser. No. 376,795, filed Jul. 7, 1989, now U.S. Pat. No. 4,906,222 and the co-pending patent application of Nancy M. Green et al, Ser. No. 403,537, filed Sept. 6, 1989, now U.S. Pat. No. 4,938,734.

Also, see the Thomey et al, U.S. Pat. No. 4,473,362, and the Thomey U.S. Pat. No. 4,551,120, for similar belt tensioners.

SUMMARY OF THE INVENTION

It is one feature of this invention to provide a new belt tensioner wherein the tensioner has means to tend to prevent the belt engaging arm from tending to cock on its shaft means due to the force of the belt being tensioned thereby acting on the pulley means of the belt engaging arm in an offset relation to the shaft means for the belt engaging arm.

In particular, it was found according to the teaching of the invention set forth in the aforementioned co-pending patent application of Dewey D. Henderson, Ser. No. 376,795, filed Jul. 7, 1989, that when the pulley means of the belt engaging arm of a belt tensioner has the belt engaging surface thereof disposed outside the axial length of the shaft means that carries the belt engaging arm, there is a tendency of the belt engaging arm to cock on the shaft means and thereby tend to rapidly wear out the bushing means of the shaft means that is disposed between the shaft means and the arm to facilitate rotatable movement therebetween.

However, it was found according to the teachings of this invention that the arm can be provided with a bearing surface angled relative to the axis of the shaft means and that the support means can have a bearing surface also angled relative to the axis and facing the bearing surface of the arm so that a bushing means can be disposed between the bearing surface and be in engagement therewith to facilitate movement therebetween and to tend to prevent cocking of the arm on the shaft means when the belt engaging arm is tensioning a belt.

It was also found, according to the teachings of this invention, that such angled bearing surfaces together with the bushing means disposed therebetween can be utilized in a unique manner to frictionally dampen the rotary movement of the belt engaging arm relative to the support means of the tensioner as will be apparent hereinafter.

Thus, one embodiment of this invention comprises a tensioner for a power transmission belt that is adapted to be operated in an endless path, the tensioner comprising a support means for being fixed relative to the belt, a belt engaging means carried by the support means and being movable relative thereto, spring means operatively associated with the support means and the belt engaging means for urging the belt engaging means relative to the support means and against the belt with a force to tension the belt, the support means comprising a shaft means having a longitudinal axis, the belt engaging means comprising an arm rotatably mounted on the shaft means, the arm having a bearing surface angled relative to the axis, the support means having a bearing surface angled relative to the axis and facing the bearing surface of the arm, and a bushing means disposed between the bearing surfaces and in engagement therewith to facilitate movement therebetween and to tend to prevent cocking of the arm on the shaft means when the belt engaging means is tensioning the belt.

Accordingly, it is an object of this invention to provide a new tensioner for a power transmission belt that is adapted to be operated in an endless path, the tensioner of this invention having one or more of the novel features of this invention as set forth above or hereinafter shown or described.

Another object of this invention is to provide a new method of making such a tensioner, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
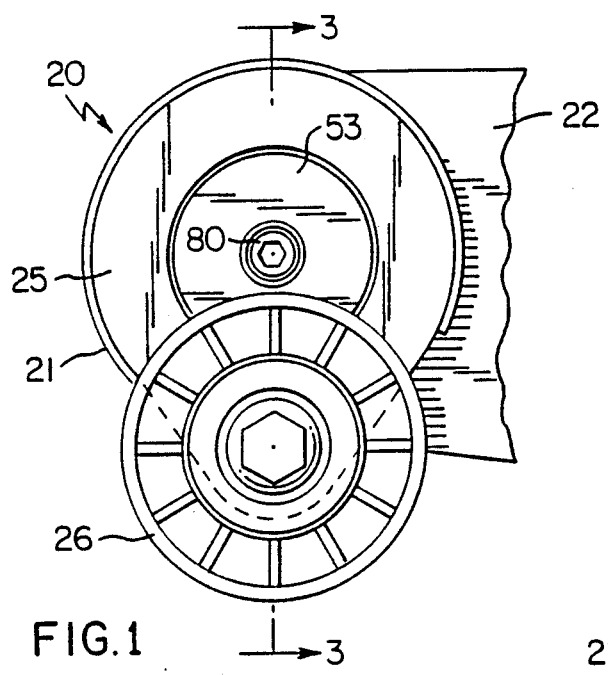
FIG. 1 is a fragmentary front view of the new belt tensioner of this invention mounted to a suitable support structure and being in one position thereof.

While the various features of this invention are hereinafter illustrated and described as being particularly adapted to provide a belt tensioner for use with an internal combustion engine for a transportation vehicle or the like, it is to be understood that the various features of this invention can be utilized singly or in various combinations thereof to provide a belt tensioner for other types of apparatus as desired.

Therefore, this invention is not to be limited to only the embodiments illustrated in the drawings, because the drawings are merely utilized to illustrate one of the wide variety of uses of this invention.

Figure 2:
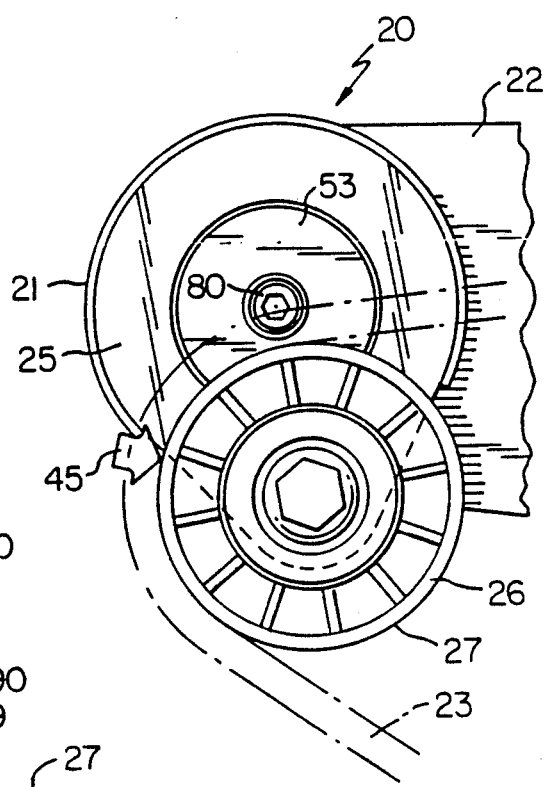
FIG. 2 is a view similar to FIG. 1 and illustrates the tensioner tensioning a power transmission belt that is illustrated in dashed lines.
Figure 3:
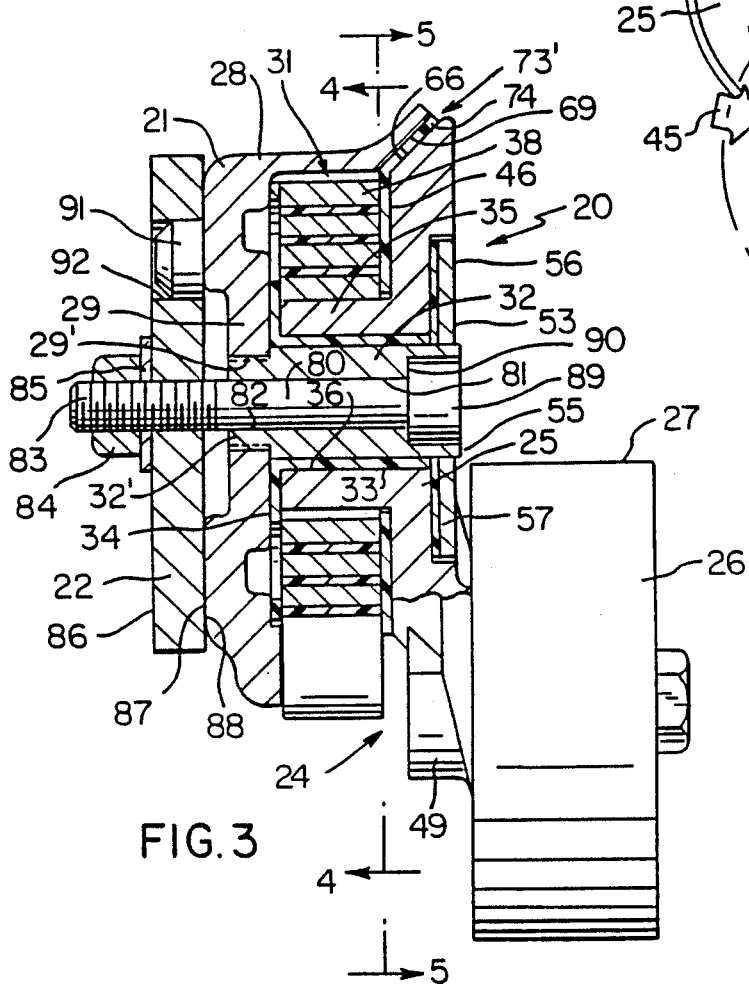
FIG. 3 is an enlarged cross-sectional view taken on line 3—3 of FIG. 1.

Referring now to FIGS. 1-3, the new tensioner of this invention is generally indicated by the reference numeral 20 and comprises a support means 21 that is fixed to a supporting structure 22, such as a support bracket for an internal combustion engine (not shown) of a transportation vehicle (not shown) or the like so that the support means 21 is fixed from movement relative to a power transmission belt 23 that is adapted to be operated in an endless path and that is illustrated by dashed lines in FIG. 2, the tensioner 20 also comprising a belt engaging means that is generally indicated by the reference numeral 24 and comprising a belt engaging arm 25 that is rotatably mounted on the support means 21 in a manner hereinafter set forth and carrying a rotatable pulley 26 having an external peripheral surface 27 adapted to engage the belt 23 to tension the same in a manner and for reasons well known in the art. For example, see the aforementioned three U.S. patents, namely, the patent to Henderson, No. 4,596,538, the patent to Thomey et al, No. 4,473,362, and the patent to Thomey, No. 4,551,120, whereby these three patents are being incorporated into this disclosure by this reference thereto.

The support means 21 of the tensioner 20 comprises a generally cup-shaped housing 28 formed of any suitable material, such as metallic material, and having a closed end 29 and an open end 30 whereby a chamber 31 is defined in the housing 28.

The support means 21 of the tensioner 20 also comprises a shaft means 32 formed of any suitable material, such as metallic material, and projects centrally from the end wall 29 of the housing 28 out of the chamber 31 thereof by having one end 32' thereof fastened in an opening 29' in the end wall 28 in any suitable manner, such as by pressfitting, whereby the shaft means 32 is stationary with the housing 28.

The belt engaging arm 25 is also formed of any suitable material, such as metallic material.

Therefore, since the housing means 28, shaft means 32 and arm 25 are formed from metallic material, such as by casting and the like, an annular bushing 33 of any suitable antifriction material, such as a suitable polymeric material, is telescoped onto the shaft means 32 and can have an annular disc-like flange 34 at one end thereof that is disposed adjacent the closed end wall 29 of the housing means 28.

The belt engaging arm 25 has a portion 35 that is provided with an opening 36 passing therethrough and defining a hub portion 37 that is telescopically disposed on the shaft means 32 of the support means 21 with the annular bushing 33 being disposed therebetween whereby the belt engaging arm 25 is adapted to rotate relative to the support means 21 with the hub portion 37 disposed in the chamber 31 of the housing means 28 while the portion 35 of the arm 25 is disposed external to the housing means 28 and substantially closes the open end 30 thereof as illustrated in FIG. 3.

Figure 4:
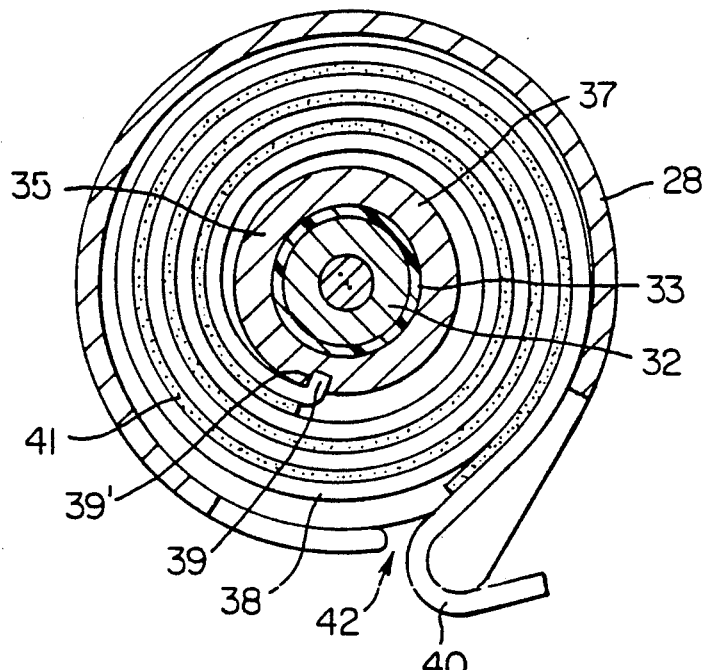
FIG. 4 is a cross-sectional view taken on line 4—4 of FIG. 3.

A metallic torsion spring 38 is coiled in a spiral relation to define an inner end 39 thereof and an outer end 40 thereof and can have a strip of antifriction material 41 interleaved between the coils thereof in a manner well known in the art, the torsion spring 38 being disposed in the chamber 31 of the housing means 28 and having its inner end 39 operatively interconnected to the belt engaging arm by being received in a suitable slot 39', FIG. 4, formed in the hub portion 37 thereof while the other end 40 of the torsion spring 38 extends out of a slot means 42 of the housing means 28 and hooks over an edge means 43 thereof so as to operatively interconnect the spring 38 to the support means 21. A suitable flexible closure member (not shown) can thereafter be disposed in the slot 42 to close the same, if desired.

In this manner, the torsion spring 38 can initially be so wound that the same always tends to rotate the belt engaging arm 25 in a clockwise direction when viewing the tensioner 20 in FIGS. 1 and 2 whereby it can be seen that the belt 23 being tensioned by such clockwise movement of the belt engaging arm 25 imposes a load on the pulley 26 that is represented by the arrow 45 in FIG. 2.

A flat disc-like member 46 formed of any suitable antifriction material, such as a suitable polymeric material, has a central opening 47 passing therethrough so as to be telescoped onto the hub portion 37 of the belt engaging arm 25 and thereby be disposed between the portion 35 of the belt engaging arm and the torsion spring 38 so as to facilitate movement therebetween.

Thus, the disc-like member 46 and the disc-like member 34 that are disposed on opposite sides of the torsion spring 38 facilitate movement of the coils thereof during movement of the arm 25 in a manner well known in the art.

The pulley 26 is rotatably mounted to an end 49 of the belt engaging arm 25 by having a threaded shaft means 50 thereof threaded into an internally threaded opening 51 in the end 49 of the arm 25 so as to be secured thereto whereby the pulley 26 can rotate on its own shaft means relative to the belt engaging arm 25 in a manner conventional in the art.

The support means 21 of the tensioner 20 also comprises an arm plate means 53 formed of any suitable material, such as metallic material, and has a central opening 54 passing therethrough so as to receive a cylindrical end portion 55 of the shaft means 32 therein and be fixed thereto in any suitable manner, such as by having the cylindrical end portion 55 fixed to the arm plate means 53 by radially outwardly expanding the end portion 55 so that the outer peripheral surface 55' thereof is placed into intimate contact with an inner surface 54' of the arm plate means 53 defined by the opening 54 thereof and extending over against the outer surface 56 of the arm plate means 53 whereby the arm plate means 53 is fixed from movement so that the belt engaging arm 25 is adapted to move relative thereto within certain limits as will be apparent hereinafter, the end portion 55 being radially outwardly expanded by a suitable tool operating against the inner peripheral surface 55" of the end portion 55 in a manner well known in the expanding art.

In order to facilitate movement of the belt engaging arm 25 relative to the arm plate means 53, a disc 57 of any suitable antifriction material, such as a suitable polymeric material, and having an opening means 58 passing centrally therethrough is telescoped onto the end portion 55 of the shaft means 32 so as to be disposed between the belt engaging means 25 and the arm plate means 53. In this manner, one side 60 of the antifriction disc 57 is disposed against a side 61 of the portion 35 of the arm 25, the side 61 of the arm 25 having a central recess 62 formed therein to accommodate the shape of antifriction disc 57 as well as the arm plate means 53 as illustrated. The other side 64 of the disc 57 is disposed against a side 65 of the arm plate 56.

As previously stated, it was found that the force load 45 of the belt 23 on the pulley 26 tends to cause the belt engaging arm 25 to cock on the shaft means 32 of the support means 21 and, thus, adversely wear out the bearing means 33, such cocking of the arm 25 being particularly noticeable when the belt engaging surface 27 of the pulley 26 is offset out of the axial length of the shaft means 32 as is relatively apparent when viewing the tensioner 20 in the position of FIG. 3 thereof.

In addition, the demand for smaller packaging of automatic belt tensioners in automobiles and the like has decreased the bearing surface area of the pivot tube bushing 33 and increased the amount of pully cocking. These problems result in reduced life of the tensioner and increased probability of the belt riding off the pulley.

Accordingly, the tensioner 20 of this invention is provided with unique structure that tends to solve the aforementioned problem, the unique structure comprising angled mating bearing surfaces on the belt engaging arm and the support means together with an angled antifriction bushing means disposed therebetween.

Figure 5:
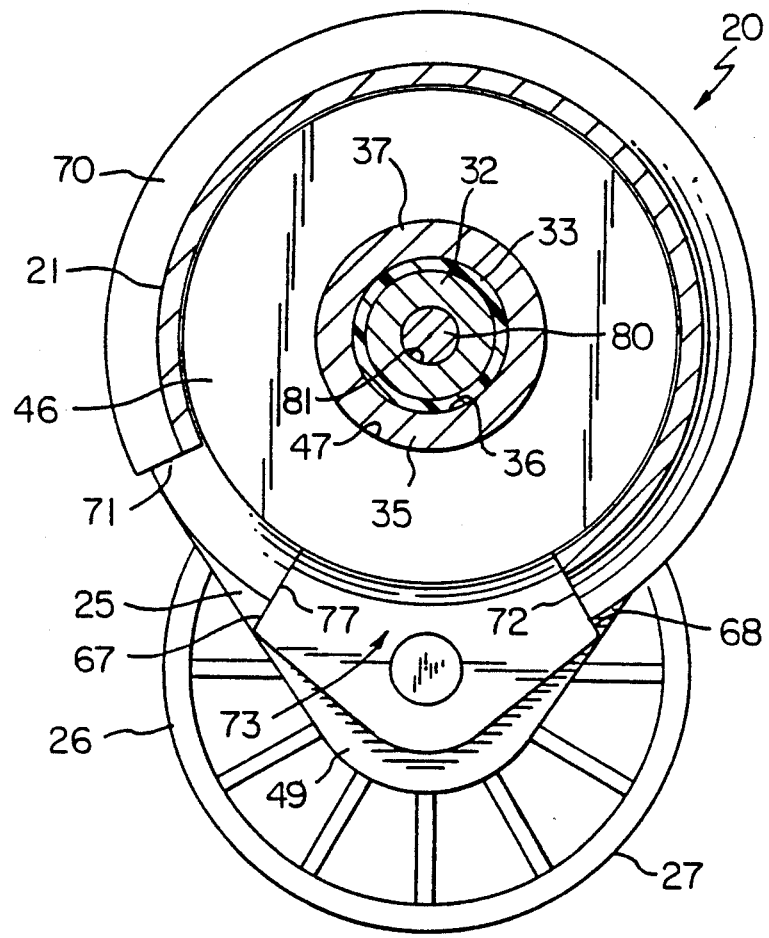
FIG. 5 is a cross-sectional view taken on line 5—5 of FIG. 3.

In particular, the belt engaging arm 25 has an arcuate angled flat surface 66 that extends from a stop surface or shoulder 67 on the end 49 of the arm 25 to another stop surface or shoulder 68 on the end 49 of the arm 25. In this manner, the bearing surface 66 of the arm 25 is generally conical as illustrated in FIG. 3 and the housing member 25 of the support means 21 is likewise provided with an angled bearing surface 69 that comprises the inside surface of an angled flange 70 that is arcuately disposed from one end 71 thereof to the other end 72 thereof that defines a space 73 therebetween and in which the end 49 of the arm 25 is disposed as illustrated in FIG. 5. The end 49 of the arm 25 is rotatably movable in the space 73 of the housing 28 from the position in FIG. 5 wherein the stop surface 68 of the arm 25 engages the stop surface 72 of the housing member 28 to the position illustrated in FIG. 5 wherein the stop surface 67 of the end 49 of the arm 25 abuts against the stop surface 71 of the housing member 28 so that pivoting movement of the arm 25 on the support means 21 is controlled by the cooperating stop surfaces 67, 71 and 68, 72.

The bearing surface 69 of the support means 21 also defines a substantially conical surface that faces the surface 66 on the arm 25 when the parts are assembled together in the manner illustrated in FIG. 3. However, a narrow gap or space 73' is provided between the facing bearing surfaces 66 and 69 and in which an angled or conically shaped bushing means 74 of any suitable antifriction material, such as polymeric material, is disposed and has opposed bearing surfaces 75 and 76 thereof respectively disposed in engagement with the bearing surfaces 66 and 69 of the arm 25 and housing member 28 as illustrated, the bushing means 74 having opposed ends 77 and 78 spaced from each other and adapted to respectively engage against the stop surfaces 67 and 68 so as to cause the bushing means 74 to rotate in unison with the arm 25.

Figure 6:
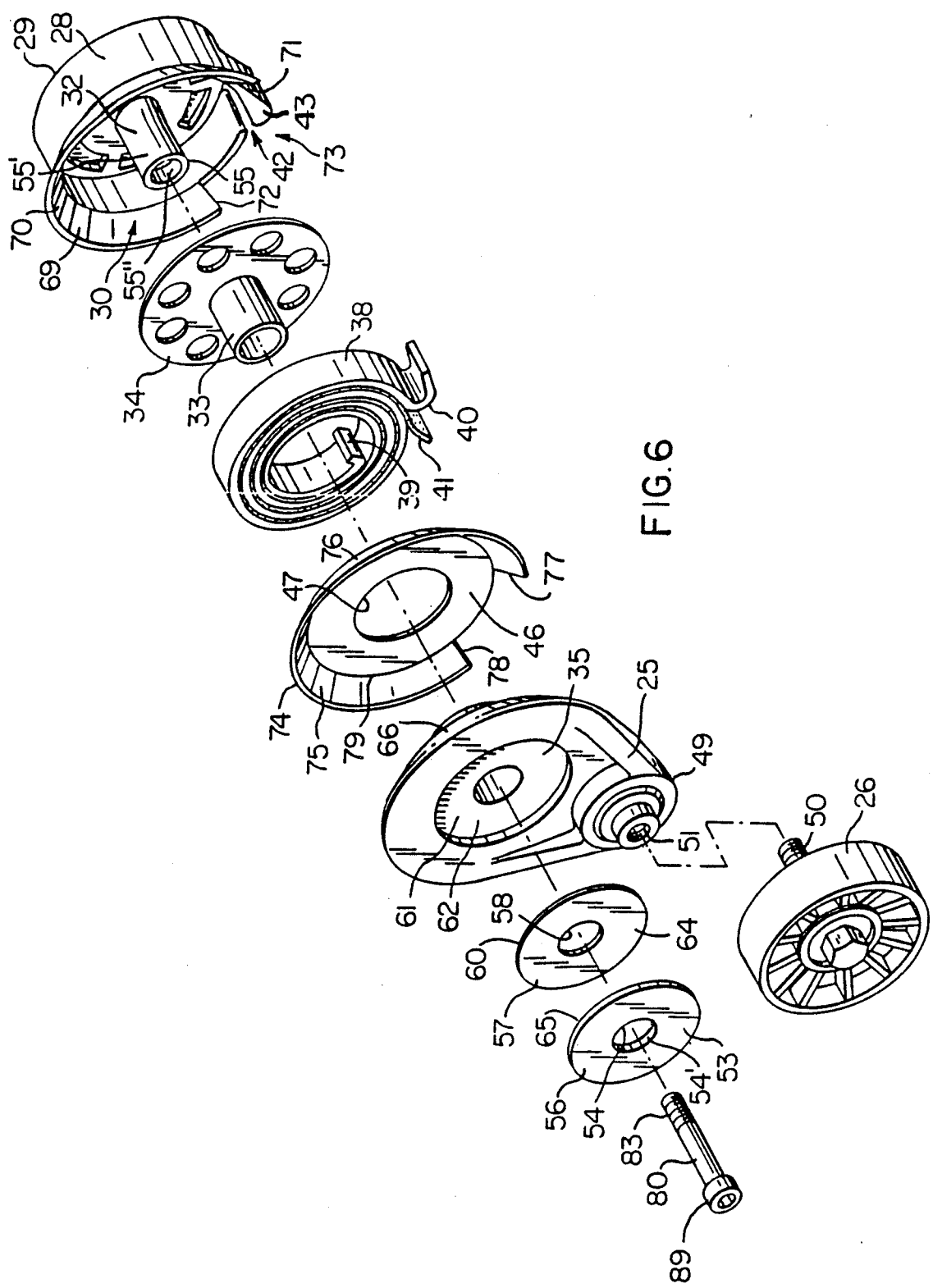
FIG. 6 is an exploded perspective view illustrating the various parts of the belt tensioner of FIGS. 1-5.

If desired, the bushing means 74 can be integral and one-piece with the antifriction disc 46 so as to extend outwardly from the outer periphery 79 thereof as illustrated in FIG. 6.

In this manner, if during the use of the tensioner 20 of this invention to tension a belt, such as the belt 23 in FIG. 2, any tendency of the arm 25 to cock on the shaft means 32 because of the offset relation of the pulley surface 27 relative to the shaft 32, causes the bearing surface 66 of the arm 25 to cock and thereby tend to compress a large arcuate area of the bushing means 74 between such surface 66 and the bearing surface 69 of the housing 29 to retard such cocking action and thereby counter the belt force 45 and hold the arm 25 from cocking on the shaft 32 even though the load force 45 is offset relative to the shaft 32.

This large surface area of the bushing means 74 that prevents cocking is achieved by the fact that the arcs described by the bearing surfaces 66 and 69 and the bushing means 74 are each greater than 180° and each has its center disposed on the longitudinal axis of the shaft means 32.

It was also found that if a large area of the bushing 74 is pressed between the surfaces 66 and 69 in the above manner to prevent cocking of the arm 25, the compressed antifriction material 74 acts as a friction dampening means that tends to retard rotary movement of the arm 25 relative to the housing member 28, such friction dampening means being particularly useful to prevent wearing out of the tensioner 20 for the reasons that are fully set forth in the aforementioned patent to Henderson, U.S. Pat. No. 4,596,538, and need not be further described.

While the tensioner 20 is adapted to be mounted to the support structure 22 in any suitable manner, the same is mounted thereto by a single bolt means 80 that passes through a central stepped opening 81 formed through the center of the shaft means 32 and through a suitable opening 82 in the support structure 22 so that its threaded end 83 can have a nut 84 threaded thereon and compact a suitable washer 85 against a side 86 of the support means 22 while a side 87 of the support means 21 of the tensioner 20 is being compacted against a side 88 of the support means 22 as an enlarged head 89 of the bolt 80 compacts against an internal shoulder 90 in the shaft means 32 as illustrated in FIG. 3. Thus, the enlarged head 89 of the bolt 80 is recessed completely within the stepped opening 81 of the shaft means 32 as illustrated.

In order to prevent rotation of the tensioner 20 on the single bolt means 80, an integral projection 91 of the support means 21 is disposed in an opening 92 formed in the support structure 22 in offset relation to the longitudinal axis of the bolt means 80 in a conventional manner.

After the tensioner 20 of this invention has been mounted to the support structure 22 in the manner previously described, the belt 23 is looped around the pulley 26 and since the length of the belt 23 is such that the same requires the pulley 26 to be moved in a counterclockwise direction from the "home" position of FIG.

1, the arm 25 is rotated in a counterclockwise direction in opposition to the force of the spring 38 to permit the belt 23 to be looped around the same so that the stops 67 and 68 at the end 49 of the arm 25 are disposed intermediate the stops 71 and 72 of the housing 28 whereby the force of the torsion spring 38 tends to move the arm 25 in a clockwise direction back to the "home" position of FIG. 1 and thereby provides a tensioning force on the belt 23 in a manner well known in the art and for reasons also well known in the art.

Thus, it can be seen that the tensioner 20 of this invention operates in a normal manner for a tensioner, such as in the manner set forth in the aforementioned Henderson, U.S. Pat. No. 4,596,538, except that the bearing surfaces 66 and 69 together with the bushing means 74 tend to prevent the arm 25 from cocking on the shaft means 32. Also, the tendency of the arm 25 to cock on the shaft means 32 compacts the bushing 74 between the bearing surfaces 66 and 69 in such a manner that the same provides a frictional dampening force that tends to retard any rotary movement of the belt engaging arm 25 on the shaft means 32 while the same is tensioning the belt 23.

Thus, it can be seen that the angled relation of the bearing surfaces 66, 69 and bushing 74 of this invention provides multiple functions, namely, prevents cocking of the arm 25 on the shaft means 32 due to an offset belt load on the pulley 26 of the tensioner 20 and provides a frictional dampening function to tend to retard rotary movement of the arm 25 on the shaft means 32.

It can also be seen that the angle provided by the surfaces 66 and 69 relative to the longitudinal axis of the shaft means 32 can be greater than 0° and less than 90° and can be chosen to optimize the counteracting force for each application of the tensioner using the same, the angled bushing means 74 between the mating surfaces 66 and 69 significantly increasing the bearing area for the belt engaging arm 25 with the increase being determined by the optimized angle and the thickness allowable for the arm 25. In fact, it can be found that the total bearing area provided by the bushing 33 with the bushing 74 can be twice as great as when only using the bushing 33 by itself. Thus, this increased bearing surface decreases the wear rate of the bushing 33 to increase the life of the bushing 33 and, thus, to increase the life of the tensioner 20 while still permitting the tensioner 20 to have the same short axial length desired for the previously described smaller packaging of tensioners for automobiles and the like.

It may be found that it is desirable to force the arm 25 axially on the shaft means 32 toward the housing member 28 so that the angled surface 66 of the arm 25 will compact the bushing 74 against the surface 69 of the housing member 28 to provide for a friction dampening of the rotary movement therebetween even if a cocking action of the arm 25 is not taking place.

Such axial loading of the arm 25 toward the housing 28 can be accomplished by compacting the disc 57 between the arm plate 53 and the arm 25 at the time the tensioner 20 is assembled so that the disc 57 is always under compression. Alternately or in combination therewith a separate spring can be provided for such axial loading force.

Figure 7:
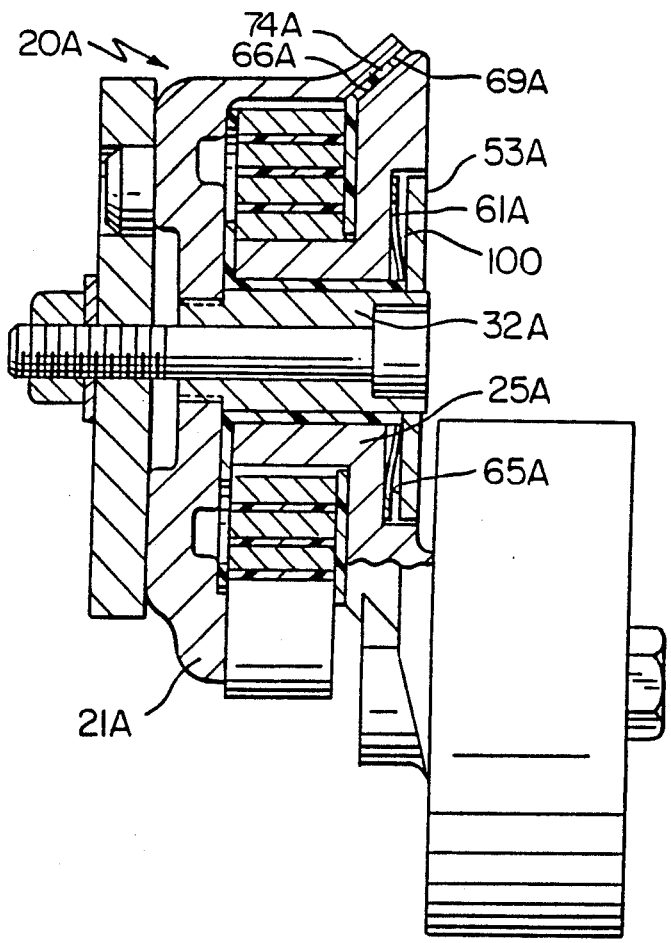
FIG. 7 is a view similar to FIG. 3 and illustrates another belt tensioner of this invention.
Figure 8:
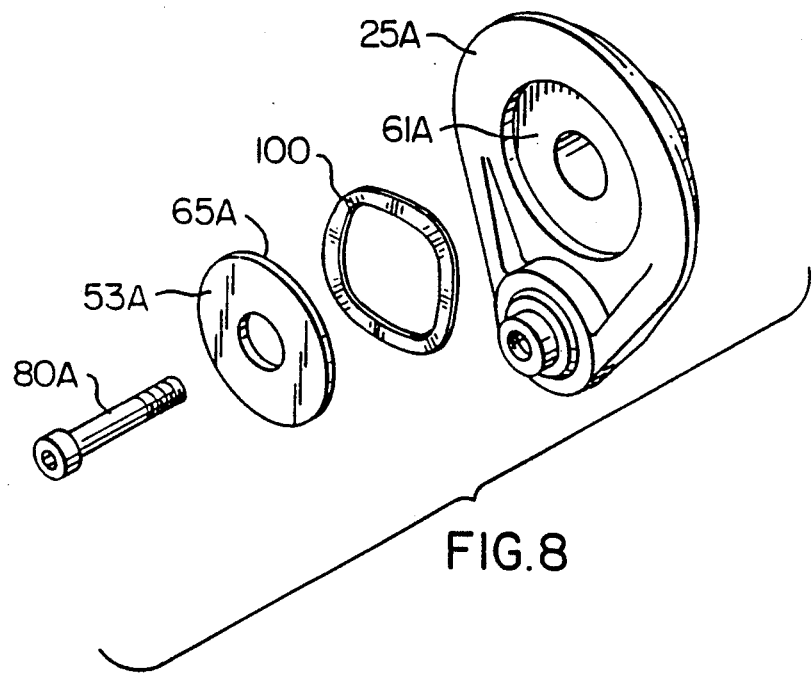
FIG. 8 is an exploded perspective view of certain parts of the belt tensioner of FIG. 7.

For example, reference is now made to FIGS. 7 and 8 wherein another tensioner of this invention is generally indicated by the reference numeral 20A and parts thereof similar to the tensioner 20 previously described are indicated by like reference numerals followed by the reference letter "A".

As illustrated in FIG. 7, the tensioner 20A is substantially identical to the tensioner 20 previously described except that in place of the arm plate bushing 57 being disposed between the arm plate 53 and the arm 25, an annular wavy spring member 100 is disposed between the arm plate member 53A and the arm 25A so as to be disposed in a normally compressed condition between the surface 65A of the arm plate 53A and the side 61A of the arm 25A at the time the tensioner 20A is assembled and thereby continuously axially forces the arm 25A to the left on the shaft means 32A as illustrated in FIG. 7 to compress the bushing means 74A between the surfaces 66A and 69A to provide friction dampening of the rotary movement of the arm 25A relative to the support means 21A in a manner similar and for the same purposes as the friction dampening means of the tensioner set forth in the aforementioned Henderson, U.S. Pat. No. 4,596,538.

Therefore, it can be seen that this invention not only provides a new tensioner for a power transmission belt that is adapted to be operated in an endless path, but also this invention provides a new method of making such a belt tensioner.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a tensioner for a power transmission belt that is adapted to be operated in an endless path, said tensioner comprising a support means for being fixed relative to said belt, a belt engaging means carried by said support means and being movable relative thereto, and spring means operatively associated with said support means and said belt engaging means for urging said belt engaging means relative to said support means and against said belt with a force to tension said belt, said support means comprising a shaft means having a longitudinal axis, said belt engaging means comprising an arm rotatably mounted on said shaft means, the improvement wherein said arm has a bearing surface angled at a certain angle relative to said axis and wherein said support means has a bearing surface angled at said certain angle relative to said axis and facing said bearing surface of said arm, and a bushing means disposed between said bearing surfaces and in engagement therewith to facilitate movement therebetween and to tend to prevent cocking of said arm on said shaft means when said belt engaging means is tensioning said belt.

2. A tensioner as set forth in claim 1 wherein said bushing means is carried by said arm so as to be rotatable in unison therewith.

3. A tensioner as set forth in claim 1 wherein said bearing surfaces are each arcuate.

4. A tensioner as set forth in claim 3 wherein said bushing means is arcuate.

5. A tensioner as set forth in claim 1 wherein said bearing surfaces and said bushing means each describe an arc that is greater than 180° and has a center that corresponds to said axis.

6. A tensioner as set forth in claim 1 wherein said tensioner comprises another spring means so constructed and arranged that said other spring means urges said arm axially on said shaft means in a direction to compress said bushing means between said bearing surfaces to provide friction dampening of the rotatable movement of said arm on said shaft means.

7. A tensioner as set forth in claim 6 wherein said other spring means comprises an annular wavy spring member.

8. A tensioner as set forth in claim 7 wherein said wavy spring member is telescoped on said shaft means.

9. In a tensioner for a power transmission belt that is adapted to be operated in an endless path, said tensioner comprising a support means for being fixed relative to said belt, a belt engaging means carried by said support means and being movable relative thereto, and spring means operatively associated with said support means and said belt engaging means for urging said belt engaging means relative to said support means and against said belt with a force to tension said belt, said support means comprising a housing means containing said spring means therein, said support means comprising an arm plate means, said support means comprising a shaft means interconnecting said arm plate means to said housing means and having a longitudinal axis, said belt engaging means comprising an arm rotatably mounted on said shaft means and having a portion disposed intermediate said arm plate means and said housing means so as to be rotatable relative thereto, the improvement wherein said portion of said arm has a bearing surface angled at a certain angle relative to said axis and wherein said housing means has a bearing surface angled at said certain angle relative to said axis and facing said bearing surface of said arm, and a bushing means disposed between said bearing surfaces and in engagement therewith to facilitate movement therebetween and to tend to prevent cocking of said arm on said shaft means when said belt engaging means is tensioning said belt.

10. A tensioner as set forth in claim 9 wherein said bushing means is carried by said portion of said arm so as to be rotatable in unison therewith.

11. A tensioner as set forth in claim 9 wherein said bearing surfaces are each arcuate.

12. A tensioner as set forth in claim 9 wherein said bushing means is arcuate.

13. A tensioner as set forth in claim 9 wherein said bearing surfaces and said bushing means each describe an arc that is greater than 180° and has a center that corresponds to said axis.

14. A tensioner as set forth in claim 9 wherein said tensioner comprises an anti-friction annular disc-like member disposed on said shaft means between said spring means and said portion of said arm.

15. A tensioner as set forth in claim 14 wherein said bushing means is carried by said disc-like member.

16. A tensioner as set forth in claim 15 wherein said bushing means and said disc-like member comprise a one-piece homogeneous member.

17. A tensioner as set forth in claim 9 wherein said tensioner comprises another spring means so constructed and arranged that said other spring means urges said arm axially on said shaft means in a direction to compress said bushing means between said bearing surfaces to provide friction dampening of the rotatable movement of said arm on said shaft means.

18. A tensioner as set forth in claim 17 wherein said other spring means comprises an annular wavy spring member disposed between said arm and said arm plate means.

19. In a method of making a tensioner for a power transmission belt that is adapted to be operated in an endless path, said tensioner comprising a support means for being fixed relative to said belt, a belt engaging means carried by said support means and being movable relative thereto, and spring means operatively associated with said support means and said belt engaging means for urging said belt engaging means relative to said support means and against said belt with a force to tension said belt, said support means comprising a shaft means having a longitudinal axis, said belt engaging means comprising an arm rotatably mounted on said shaft means, the improvement comprising the steps of forming said arm to have a bearing surface angled at a certain angle relative to said axis and said support means to have a bearing surface angled at said certain angle relative to said axis and facing said bearing surface of said arm, and disposing a bushing means between said bearing surfaces and in engagement therewith to facilitate movement therebetween and to tend to prevent cocking of said arm on said shaft means when said belt engaging means is tensioning said belt.

* * * * *